Figure 1:
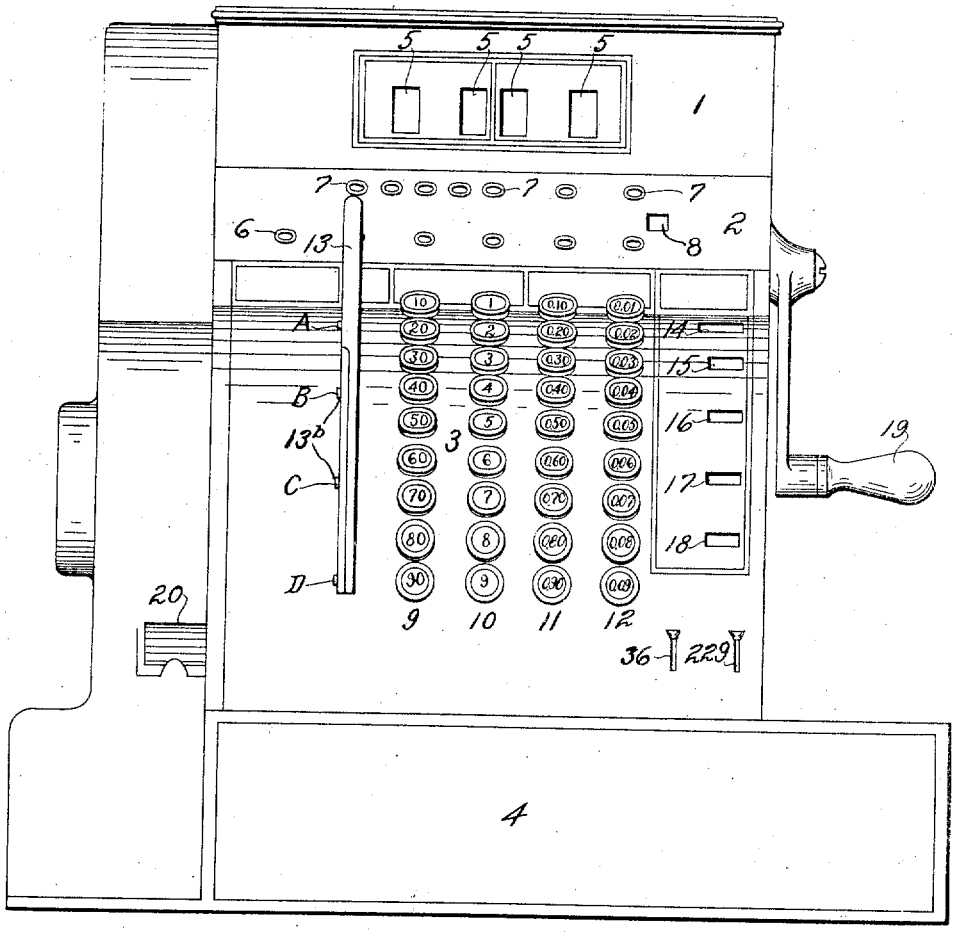

R. T. PISCICELLI.

CASH REGISTER.

APPLICATION FILED OCT. 6, 1911.

Reissued Oct. 21, 1913.

13,632.

14 SHEETS—SHEET 1.

Witnesses

W. M. McCarthy

H. F. Sadgebury

Inventor

Roberto T. Piscicelli by R. C. Glass

Attorney

R. T. PISCICELLI.

CASH REGISTER.

APPLICATION FILED OCT. 6, 1911.

Reissued Oct. 21, 1913.

13,632.

14 SHEETS—SHEET 2.

Witnesses

W. M. McCarthy

H. F. Sadgebury

Inventor

Roberto T. Piscicelli by R. C. Slade

Attorney

R. T. PISCICELLI.

CASH REGISTER.

APPLICATION FILED OCT. 6, 1911.

Reissued Oct. 21, 1913.

13,632.

14 SHEETS—SHEET 3.

Witnesses

W. M. McCarthy

H. F. Sadgebury

Inventor

Roberto T. Piscicelli by R. C. Slade

Attorney

R. T. PISCICELLI.

CASH REGISTER.

APPLICATION FILED OCT. 6, 1911.

Reissued Oct. 21, 1913.

13,632.

14 SHEETS—SHEET 4.

Witnesses

W. M. McCarthy

H. F. Sadgebury

Inventor

Roberto T. Piscicelli by R. C. Slack

Attorney

R. T. PISCICELLI.

CASH REGISTER.

APPLICATION FILED OCT. 6, 1911.

Reissued Oct. 21, 1913.

13,632.

14 SHEETS—SHEET 5.

Witnesses

W. M. McCarthy

H. F. Sadgebury

Inventor

Roberto T. Piscicelli by R. Blair

Attorney

R. T. PISCICELLI.

CASH REGISTER.

APPLICATION FILED OCT. 6, 1911.

Reissued Oct. 21, 1913.

13,632.

4 SHEETS—SHEET 6.

Witnesses

W. M. McCarthy

H. F. Sadgrbury

Inventor

Roberto T. Piscicelli by R. C. Class

Attorney

R. T. PISCICELLI.

CASH REGISTER.

APPLICATION FILED OCT. 6, 1911.

Reissued Oct. 21, 1913.

13,632.

14 SHEETS—SHEET 7.

Witnesses

W. M. McCarthy

H. F. Sadgebury

Inventor

Roberto T. Piscicelli by R. C. Bass

Attorney

R. T. PISCICELLI.

CASH REGISTER.

APPLICATION FILED OCT. 6, 1911.

Reissued Oct. 21, 1913

13,632.

14 SHEETS—SHEET 8.

Witnesses.

W. M. McCarthy

H. F. Sadgebury

Inventor

Roberto T. Piscicelli by R. Blass

Attorney

R. T. PISCICELLI.

CASH REGISTER.

APPLICATION FILED OCT. 6, 1911.

Reissued Oct. 21, 1913.

13,632.

14 SHEETS—SHEET 9.

Witnesses

W. M. McCarthy

H. F. Sadgebury

Inventor

Roberto T. Piscicelli by R. C. Lass

Attorney

R. T. PISCICELLI.

CASH REGISTER.

APPLICATION FILED OCT. 6, 1911.

Reissued Oct. 21, 1913.

13,632.

14 SHEETS—SHEET 10.

Witnesses

W. M. McCarthy

H. F. Sadgbury

Inventor

Roberto T. Piscicelli by R. C. Glass

Attorney

R. T. PISCICELLI.

CASH REGISTER.

APPLICATION FILED OCT. 6, 1911.

Reissued Oct. 21, 1913.

13,632.

14 SHEETS—SHEET 11.

Witnesses

W. M. McCarthy

H. F. Sadgebury

Inventor

Roberto T. Piscicelli by R. C. Glass

Attorney

R. T. PISCICELLI.

CASH REGISTER.

APPLICATION FILED OCT. 6, 1911.

Reissued Oct. 21, 1913. 13,632.

14 SHEETS—SHEET 12.

Witnesses

Wm. McCarthy

H. F. Sadgebury

Inventor

Roberto T. Piscicelli by R. C. Class

Attorney

R. T. PISCICELLI.

CASH REGISTER.

APPLICATION FILED OCT. 6, 1911.

Reissued Oct. 21, 1913. 13,632.

14 SHEETS—SHEET 13.

Witnesses

W. M. McCleartty

H. F. Sadgebury

Inventor

Roberto T. Piscicelli by R. C. Hasse

Attorney

R. T. PISCICELLI.

CASH REGISTER.

APPLICATION FILED OCT. 6, 1911.

Reissued Oct. 21, 1913

13,632.

14 SHEETS—SHEET 14.

Witnesses

W. M. McCarthy

H. F. Sadgebury

Inventor

Roberto T. Piscicelli

M. P. Clyde

Attorney

UNITED STATES PATENT OFFICE.

ROBERTO TAEGGI PISCICELLI, OF PARIS, FRANCE, ASSIGNOR TO THE NATIONAL CASH REGISTER CO., OF DAYTON, OHIO, A CORPORATION OF OHIO, (ORGANIZED IN 1906.)

CASH-REGISTER.

13,632. Specification of Reissued Letters Patent. Reissued Oct. 21, 1913.

Original No. 872,845, dated December 3, 1907, Serial No. 384,743. Application for reissue filed October 6, 1911. Serial No. 653,246.

*To all whom it may concern:*

Be it known that I, ROBERTO TAEGGI PISCICELLI, a subject of Italy, and resident of Paris, France, have invented certain new and useful Improvements in Cash-Registers, of which I declare the following to be a full, clear, and exact description.

This invention relates to machines of the type employing a plurality of totalizers for summing up separately the receipts of different clerks, departments of a store, or any other purpose wherein it is desired to keep a segregated analysis of different classes of transactions, and a principal object is to provide a plurality of summing devices in the form of totalizers, the elements of which are so arranged that the movement of the frame, in which said totalizers are supported, to bring any totalizer into position to be actuated is greatly reduced. To accomplish this principal object as herein stated the elements of the summing devices or totalizers are mounted in any suitable manner with the various denominational elements of the different totalizers grouped together, by which construction it is necessary only to move the frame the distance between adjacent totalizer elements in order to bring another totalizer into position to be actuated.

This invention in addition to the principal object above stated includes several other objects as will appear from the description under the different subheadings into which the detail description, which follows, is divided.

The machine is capable of performing the following operations: 1st summing up separately the money received in the various departments. 2nd summing up all these totals in a grand total. 3rd showing the number of receipts or tickets issued in each department. 4th giving the total number of tickets issued. 5th showing by means of indicators both to the public and to the cashier each amount at the moment it is received. 6th issuing tickets on each of which is printed the name of the department, the amount received, the date and a number. 7th printing a duplicate of the amounts received in all the sale departments and arranging these amounts in columns.

The machine illustrated in the drawings is designed for four departments called hereinafter A, B, C, D; and is fitted with four sets of keys for registering sales up to 99.99 each in units of decimal money. It is evident however that the machine may be readily modified for pounds, shillings and pence or other money if desired.

Figure 2:
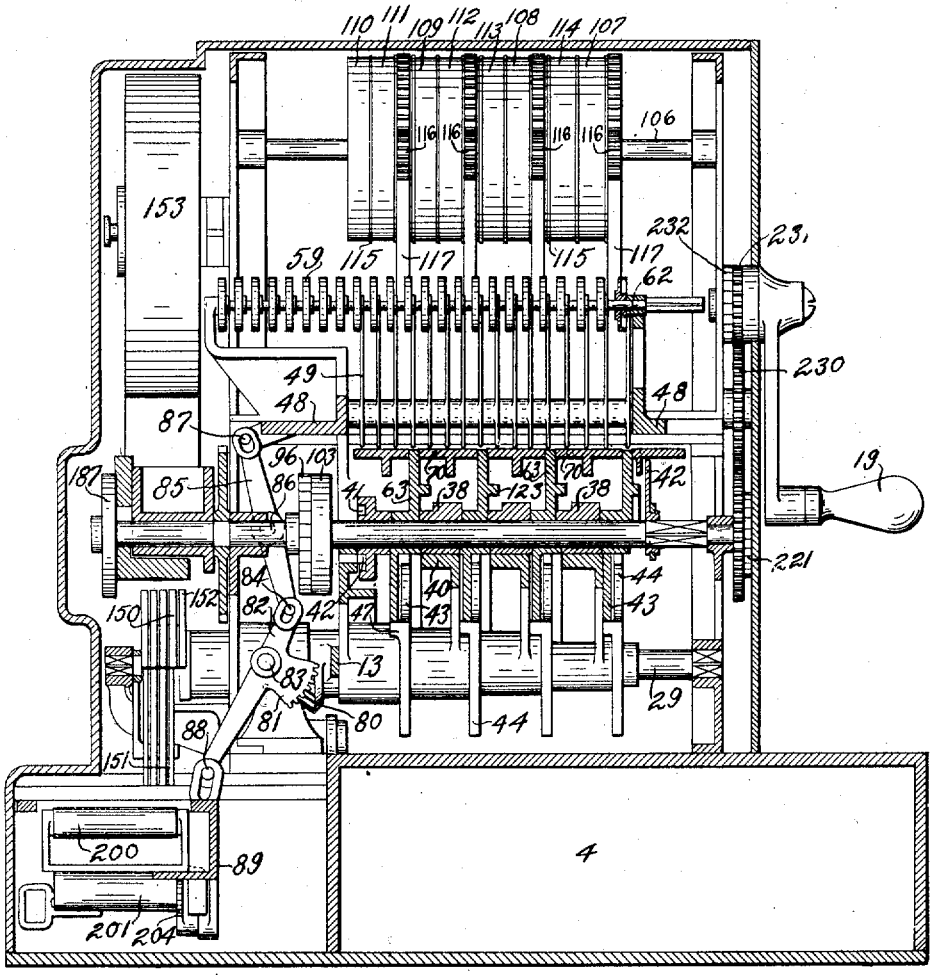
Figure 3:
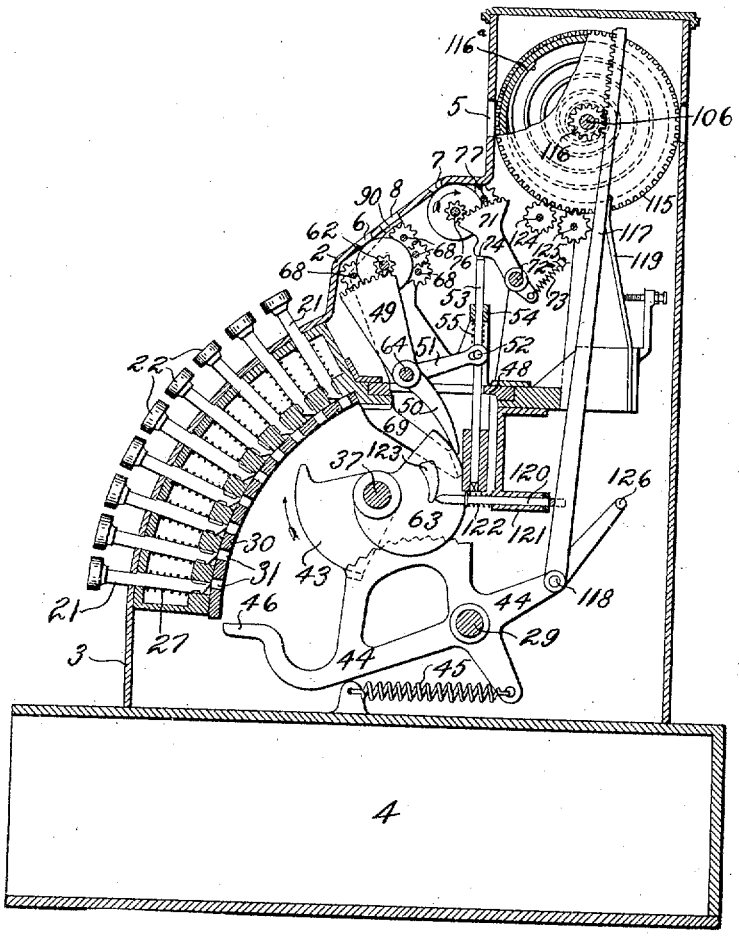
Figure 4:
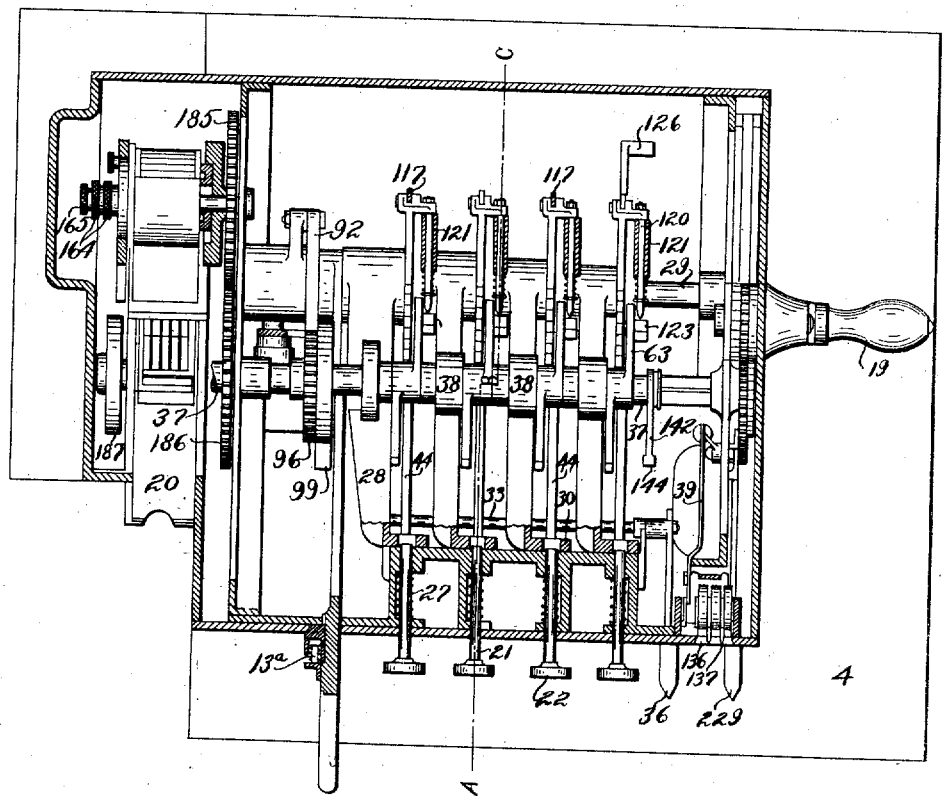
Figure 5:
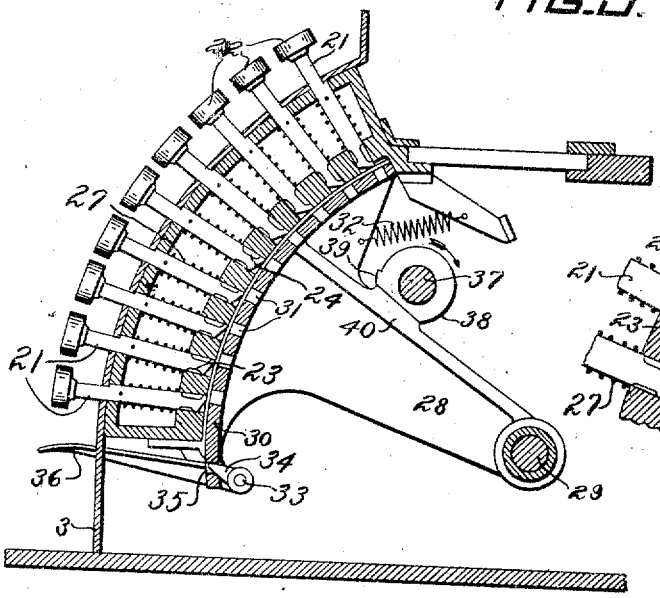
Figure 6:
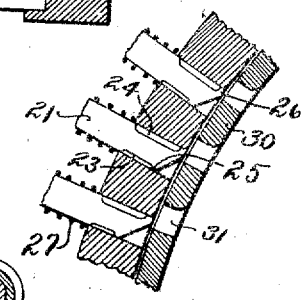
Figure 7:
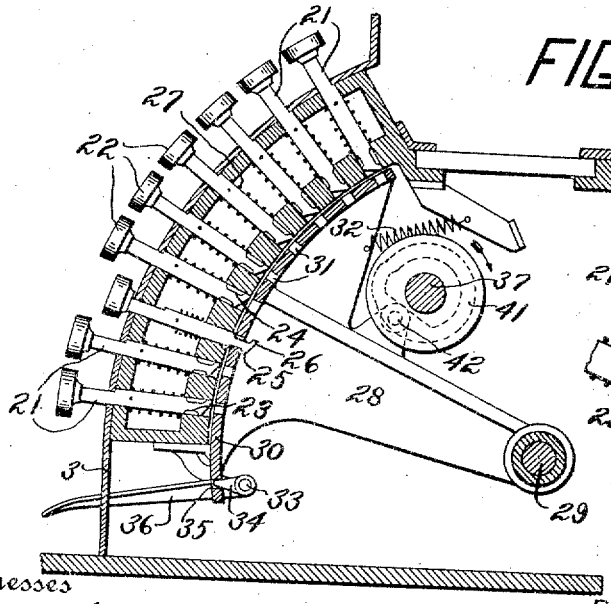
Figure 8:
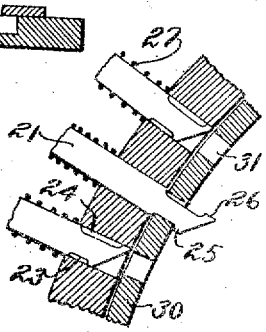
Figure 9:
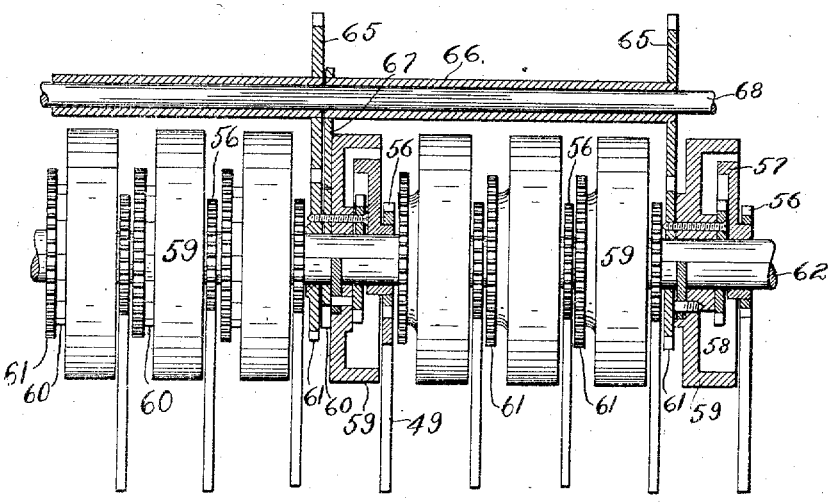
Figure 15:
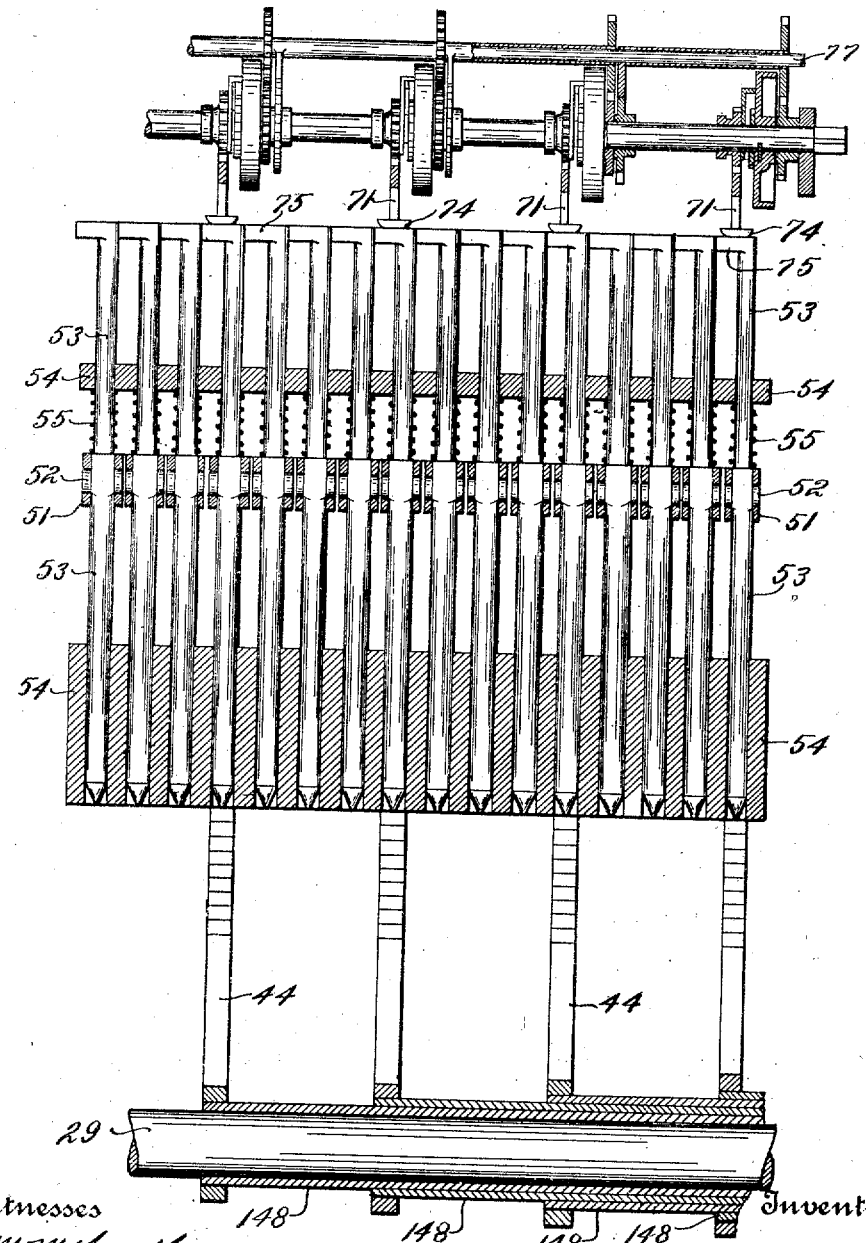
Figure 16:
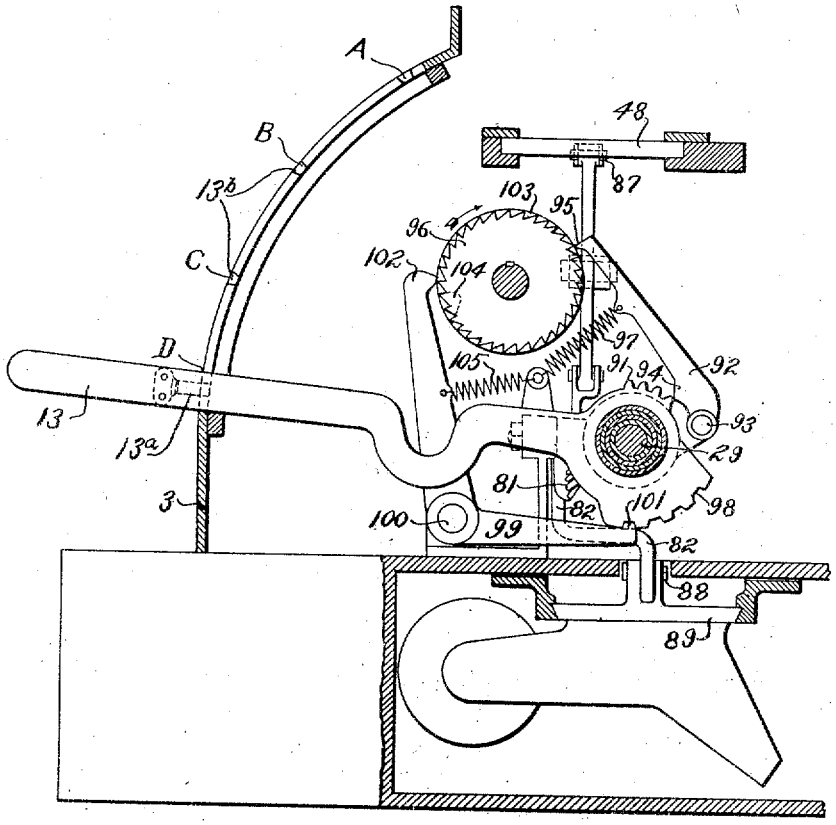
Figure 17:
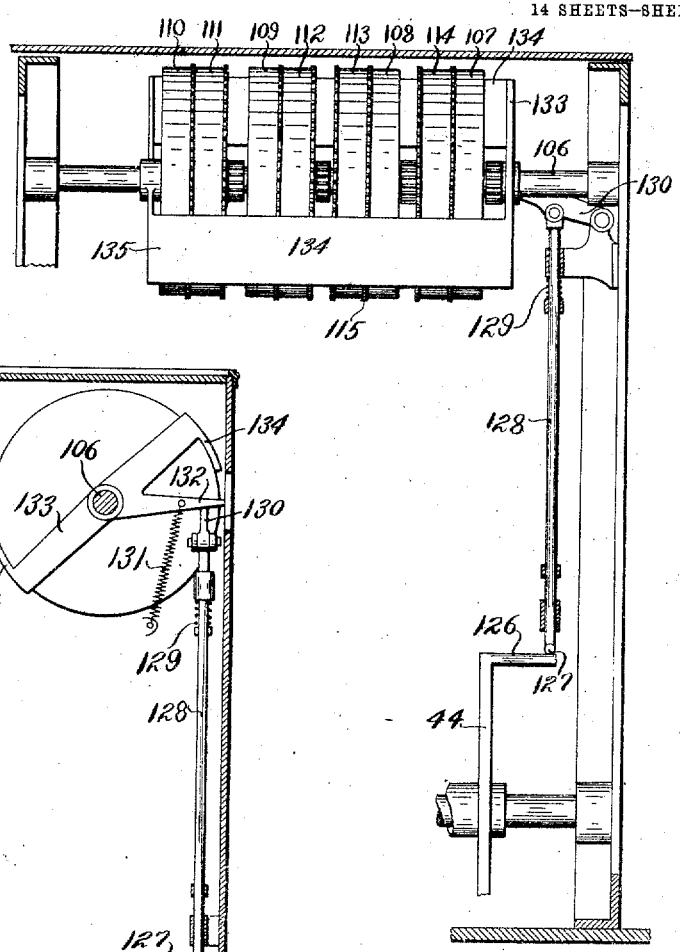
Figure 18:
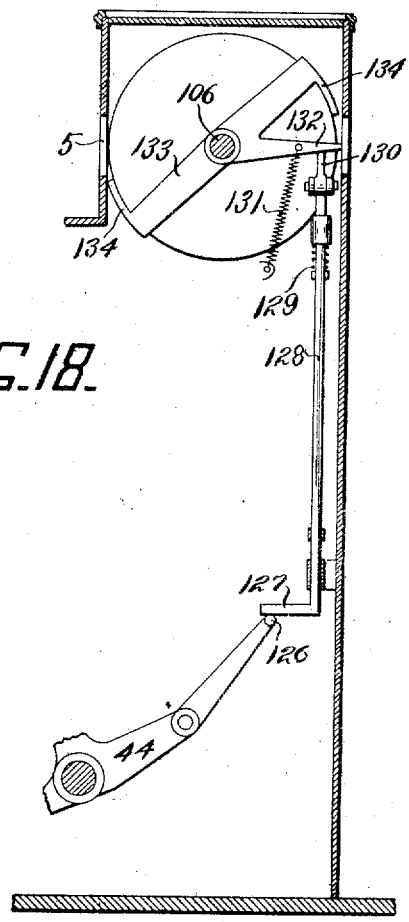
Figure 21:
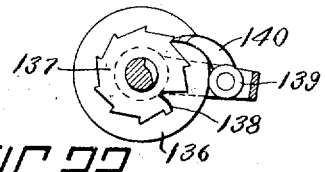
Figure 20:
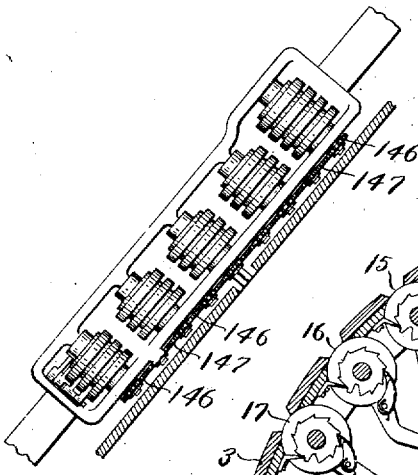
Figure 22:
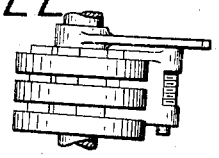
Figure 19:
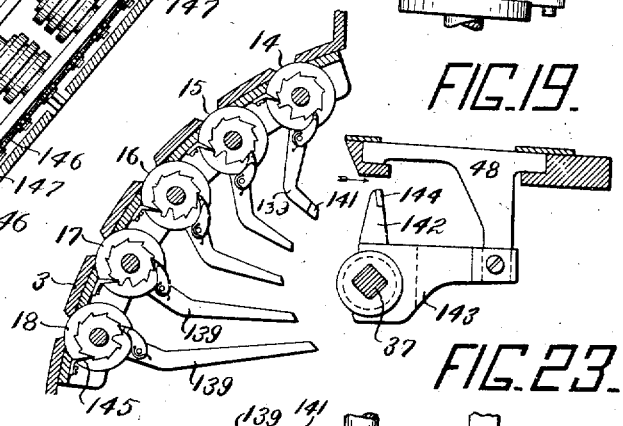
Figure 23:
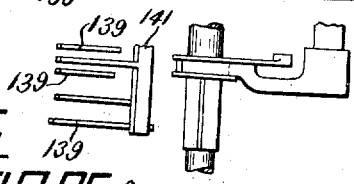
Figure 24:
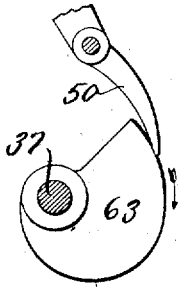
Figure 25:
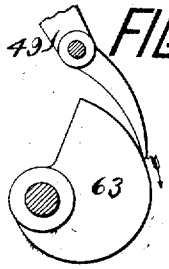
Figure 26:
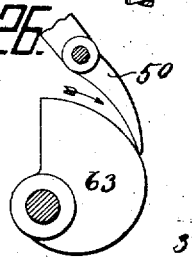
Figure 27:
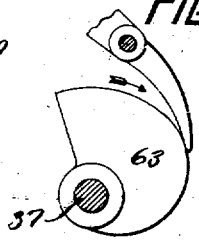
Figure 28:
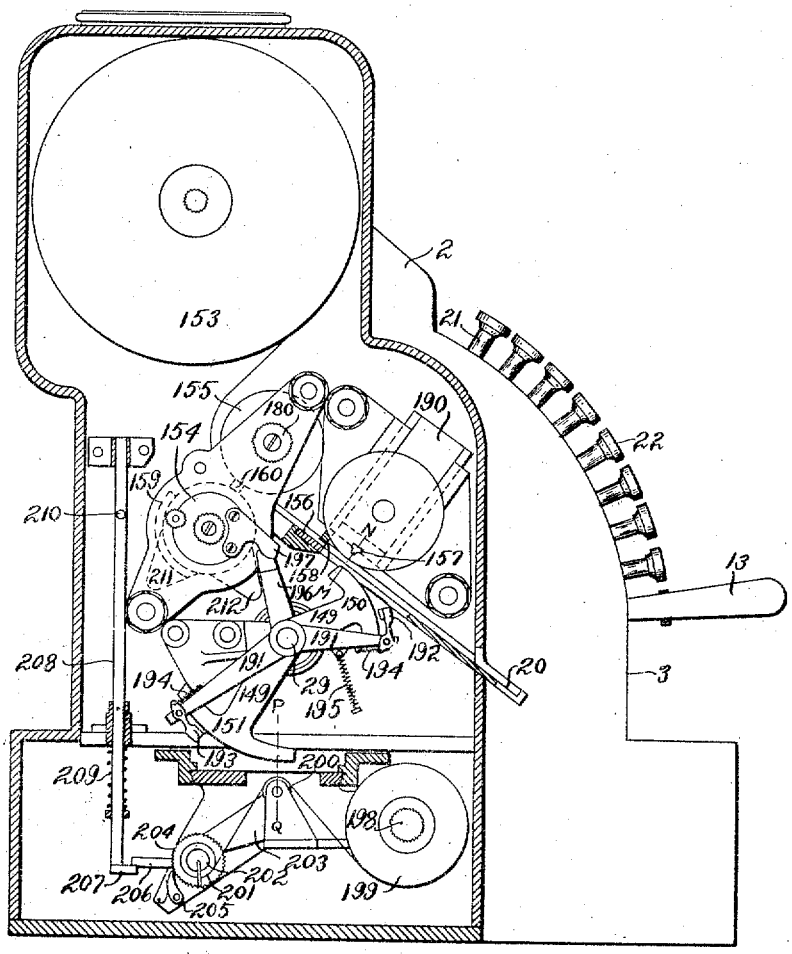
Figure 29:
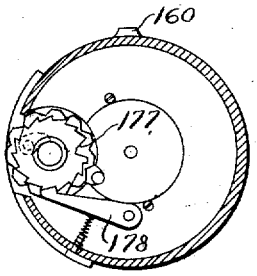
Figure 30:
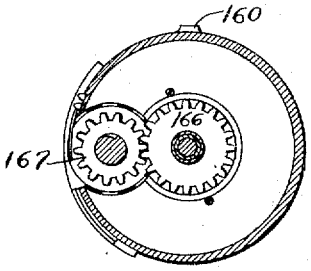
Figure 31:
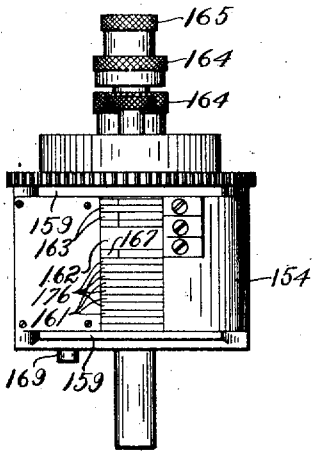
Figure 32:
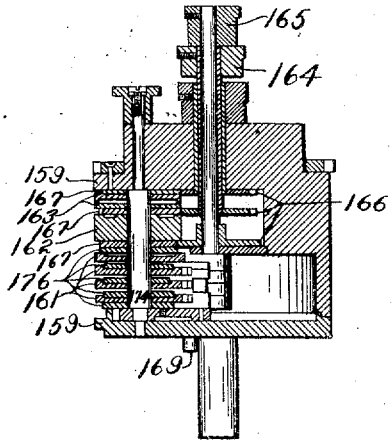
Figure 33:
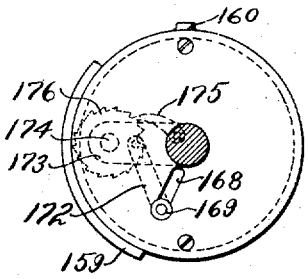
Figure 34:
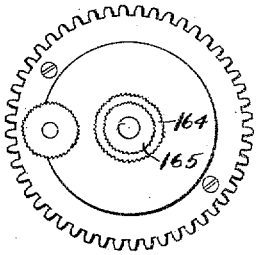
Figure 35:
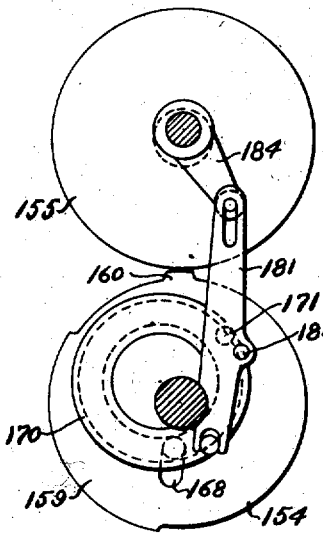
Figure 36:
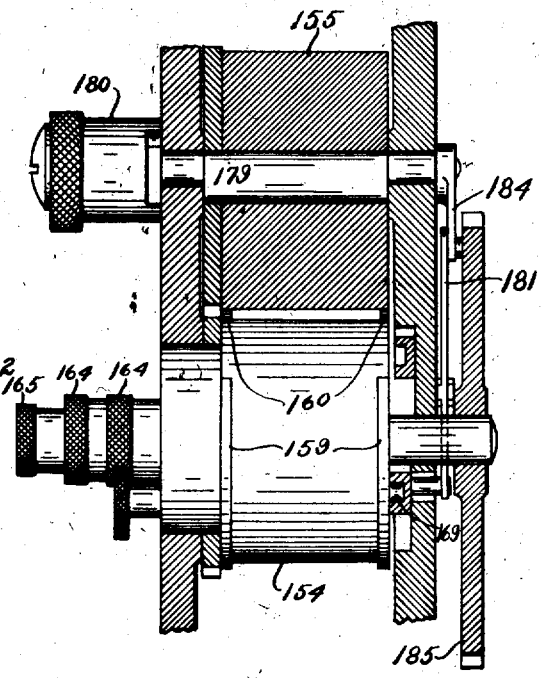
Figure 37:
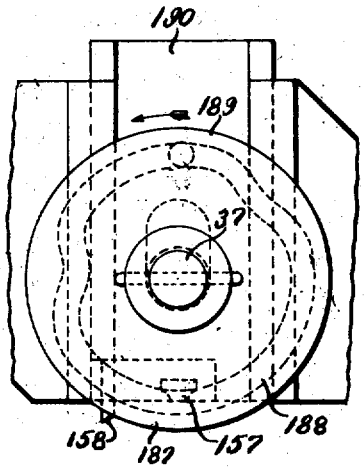
Figure 38:
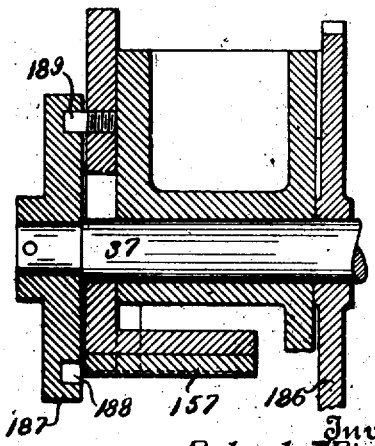
Figure 39:
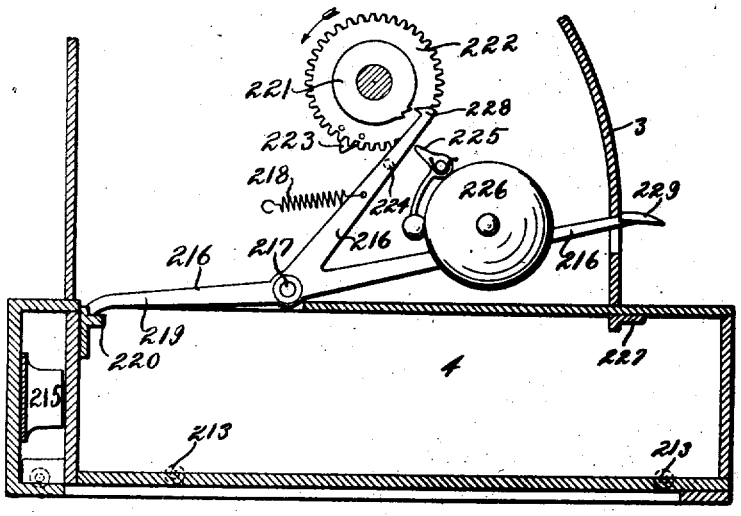
Figure 40:
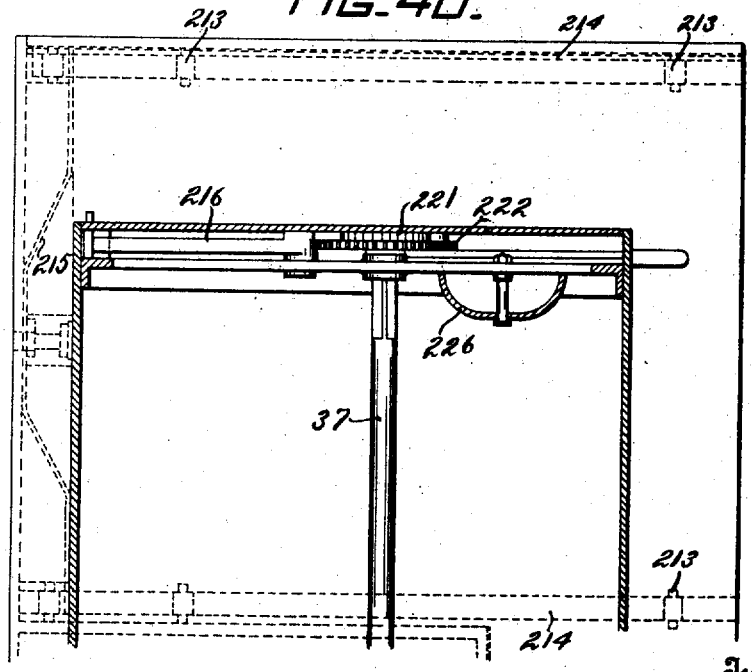

In the annexed drawings: Figure 1 is an elevation of the cashier's side of the machine. Fig. 2 is a longitudinal section. Fig. 3 is a transverse section on the line A B C Fig. 4. Fig. 4 is a horizontal section. Fig. 5 shows the mechanism for locking the keys which are all shown in their raised position. Fig. 6 shows part of Fig. 5 to a larger scale. Fig. 7 shows the mechanism for locking the keys when one of them is pressed down. Fig. 8 shows part of Fig. 7 to a larger scale. Fig. 9 shows to a larger scale part of the mechanism of the summing apparatus. Figs. 10, 11, 12, 13 and 14 show details of this summing apparatus. Fig. 15 shows the method of operating the total summing apparatus from the partial summing apparatus. Fig. 16 shows the lever for setting the machine to record for the different departments, and the gearing connected therewith. Figs. 17 and 18 are two views of the mechanism for covering the indicators during their movement. Figs. 19 and 20 are two views of the partial numerators, of the general numerator and of the device for actuating them. Figs. 21, 22 and 23 show details of these numerators. Figs. 24 to 27 show the various positions of the cams controlling the movement of the several summing apparatus. Fig. 28 is a side elevation of the printing apparatus. Figs. 29 to 34 show details of the cylinder which prints the date and number upon the tickets. Figs. 35 and 36 show the device by means of which this cylinder is put out of action. Figs. 37 and 38 show the mechanism for cutting off the tickets and printing on them the name of the department and the amount of each sale. Figs. 39 and 40 show the mechanism for opening the drawer.

The machine viewed from the cashier's side (see Fig. 1) shows on its upper part, a vertical plate 1, an incline 2, a cylindrical part 3, and a drawer 4 at the bottom. In the vertical plate 1 there are four openings 5, through which the figures of the indicators appear, to show the amount of each sale. In the incline 2 there are openings ranged in two horizontal lines. Through the lower openings 6 appear the figures of each partial summing apparatus and through the upper ones 7 those of the general summing apparatus. In the incline 2 there is also another opening 8 where appears the name of the department whose total is shown.

Four sets of keys 9, 10, 11, 12 project from the cylindrical part 3. Each set consists of nine keys arranged at equal distances in a vertical line and marked with figures 10 to 90 or 1 to 9 on their heads. Set 9 represents tens of francs, set 10 units of francs, set 11 tens of centimes, and set 12 units of centimes.

A lever 13 on the left hand of the keys pivoted concentrically with the drum 3, determines the department against which the amount received shall be registered according to the position in which it is stopped at the letter A B C or D respectively. On the right hand are five openings through which the indications of five numerators appear, the upper one 14 shows the total number of sales and the others 15, 16, 17, 18 show the numbers of sales in each department.

From the right of the machine projects a handle 19, for operating the machine after the value to be registered has been determined by the keys and the department by the lever 13.

The other side of the machine seen by the public, has four openings only in its upper part similar to 5, through which the sum paid by any purchaser is shown.

*Directions for working the machine.*—In order that the machine may issue a ticket and perform the above mentioned operations it will be sufficient, 1st to turn the lever 13 and stop it at the name of the proper department. 2nd to determine the amount to be registered by pressing the keys composing this amount. 3rd to give two revolutions to the handle 19. These operations having been effected a ticket printed with a number, the date, the name of the department and the amount received will be issued. At the same time the indicator will show both to the cashier and the purchaser the same amount, the grand total summing apparatus, and the partial summing apparatus, corresponding to the department in question, will add this amount to their previous totals, the total numerator and the partial numerator corresponding to the department will advance one unit, and a duplicate of the ticket issued will be printed upon a paper web inside the machine. It may be remarked that by moving the lever 13 none of the summing apparatus and none of the numerators will be altered. When however this lever is displaced and stopped at a certain department, the preceding total of the money received by it will appear at the openings 6. The indications of the various partial summing apparatus can therefore be read by displacing the lever 13 and stopping it successively at the various departments.

*Description of the Internal Mechanism of the Machine.*

The machine consists of two parts, one the registering mechanism, viz: the indicators, numerators and summing apparatus; the other mechanism for printing tickets and duplicates.

*Locking the keys* (see Figs. 5, 6, 7, 8).—Each key consists of a small rod 21 working in a guide fixed to the drum 3; this rod is fitted with a head 22 having on it a number (1 to 9 or 10 to 90) while its inner end is beveled and has two notches 23, 24, and two teeth 25 and 26. Each key is surrounded by a helical spring 27 which on pressing the key is compressed and tends to push the key back to its former position. Within the machine and in correspondence with each set of keys, there is a sector 28 pivoted on the shaft 29 and fitted with a rim 30 concentric with the cylindrical part 3 of the machine. The rim 30 has in it holes 31 in each of which the end of a key may enter. Each sector 28 is pulled upward by a spring 32 and in its normal position the holes of the sector are above those of the drum so that the beveled ends of the keys bear on the edges of the holes 31 as shown at Figs. 3 and 5. It is evident that on pressing upon the head of the key it will by its bevel end force down the rim 30 so that the notch 23 may reach the position shown in Fig. 8. The rim 30 urged by the spring 32 will then rise a distance equal to the depth of the notch 23 lock the key and prevent its return.

*Preventing the lowering of any key of a set when another key of the same set has already been locked.*—From what has been stated above it ensues that when a certain key is locked the sector 28 will remain lowered by a distance equal to the diameter of the rod of the key diminished by the depth of the notches 23 and 24, and thereby all the teeth 26 of the other keys of the set, will rest as shown in Fig. 8 against the edges of the respective holes 31 and consequently it is impossible to lower any other key.

*To correct a mistake on locking a key by restoring all the parts to the normal position.*—If a key is wrongly lowered the mistake may be corrected before the machine is operated. For this purpose there is a horizontal spindle 33 on which arms 34 are keyed engaging holes 35 in the rims 30. Fast with the spindle 33 is a lever arm 36 projecting from the front of the machine. When this arm 36 is pressed down the arms 34 will depress the rim 30 and free the teeth 25. Therefore any keys that have been lowered will be raised by their springs to their normal positions.

*Preventing the lowering of any key during the movement of the machine.*—For this purpose on the main shaft 37 there is keyed for each sector 28 a segmental cam 38 with a tooth 39. When the machine is operated the cam 38 will turn in the direction of the arrow. If none of the keys of the set corresponding to this cam is lowered the cylindrical edge of the cam will come against a rib 40 projecting from the sector 28 and press it down during the movement of the machine; it will in other words cause the same effect as if a key were locked, that is it will prevent another key of the same set being lowered. If a key of the set were already lowered the cam would have no effect on the sector, because its cylindrical edge will merely touch the rib 40 without forcing it down.

*Preventing the lowering of the lever arm 36 during the movement of the machine.*—While three of the sectors 28 are actuated by cams 38 as above stated, the fourth sector has a grooved cam 41 (Fig. 7) engaging a pin 42 upon it. It is evident that while the shaft 37 and cam 41 turn, and the pin 42 is in the circular part of the groove, the sector 28 cannot be displaced and therefore it is impossible to move the lever 36 for releasing the keys. One arrangement of this kind will be sufficient for the four sets of keys, inasmuch as all the arms 34 are fixed on the same shaft 33 and therefore whenever one of them is held fast the shaft and lever 36 are also held.

*Freeing the keys automatically after each revolution of the machine.*—After each revolution of the machine the tooth 39 of the cam 38 will come in contact with the rib 40 and depress the sector 28 exactly the height of the teeth 25 whereby these will be released and the keys will return to their normal position. In the case of the sector 28 controlled by the groove cam 41 the groove is so shaped that the pin 42 is moved away from the center of the cam and thus the sector is lowered as required to free the key which has been locked.

*The summing apparatus* (see Fig. 3).—The handle 19 and shaft 37 revolve in the direction of the arrow, and a cam 43 keyed on the shaft will leave a piece 44 free to turn (under the influence of a spring 45) on the shaft 29 until its end 46 is stopped by the key lowered in the corresponding set. It is evident that the arc described by the end 46, and therefore by any point of the piece 44, is proportional to the value of the key which has been depressed. Should no key be lowered the end 46 will strike against the top of the key guide corresponding to *nil*. The piece 44 has cut upon it ten consecutive arcs struck from the axis of the shaft 29 at which they subtend equal angles with radii of varying lengths, the longest corresponding to *nil* and the shortest to 9, that is to the lowest key of the set. There is one piece 44 for each set and the arcs determine the operation of the various summing apparatus.

*The partial summing apparatus or department totalizers* (see Figs. 2, 3, 9, 10, 11, 12, 13, 14, 16).—These totalizers are carried by a carriage 48 movable transversely by means of the lever 13 so as to bring the totalizer, which belongs to the department for which a transaction is to be recorded, into position to be actuated.

In order to reduce the travel of the carriage the elements of the various totalizers are arranged in denominational groups upon a transverse shaft 62, which is mounted in the carriage 48; that is, the four elements for the units of centimes are mounted upon the shaft 62 adjacent to each other, and next to these elements are mounted the elements for the tens of centimes, after which are grouped successively the elements of the various totalizers in ascending denominational order until the desired registering capacity has been reached. By this arrangement of the elements of the various totalizers it is obvious that when a totalizer is moved out of position in which it is actuated and the adjacent totalizer brought into position to be actuated, the carriage will be moved only the short distance between the elements of the totalizer that is moved out of position to be actuated and the totalizer that is moved into position to be actuated, whereas if all of the elements of each totalizer were grouped together upon the shaft, it would be necessary to shift the carriage a distance corresponding to the width of all the elements of the totalizer that is normally in position to be actuated.

The totalizer elements or wheels 59, which are directly actuated under the control of the different sets of keys, are provided with pinions 56, with which mesh rack portions of actuators or sectors 49 that are pivoted upon a transverse shaft 64 mounted in the carriage 48. The actuators or sectors 49 are provided with downwardly and rearwardly extending arms 50 and 51 respectively, the former coöperating with cams 63 secured to the shaft 37 and the latter being connected to rods 53 by pin and slot connections 52.

After the determining devices or pieces 44 have been positioned the cams 63 will pass out of engagement with the arms 50 and springs 55 surrounding rods 53 will force the rods, corresponding to the elements 59 of the totalizer that is in operative position, downwardly distances determined by the steps of the adjusted pieces 44, and thereby rotate the actuators or sectors 49 coöperating therewith corresponding distances. As previously stated the sectors 49 mesh with pinions 56 and attached to the pinions are arms 57, Fig. 14, which carry pawls that engage with ratchet wheels 58, Fig. 13, secured to the totalizer drums or elements 59. This pawl and ratchet between the actuators 49 and the totalizer element 59 as is well known forms a one way connection between said actuators and elements, which one way connection is effective when the actuators are rotated in a clockwise direction, Fig. 3. Near the end of the operation of the machine the cams 63, will, by engaging the arms 50 of the displaced actuators, return the latter and the rods 53 to normal position. The rods 53 are guided in their upward and downward movement by a cross piece 54 of the carriage frame 48. In shifting the frame 48 to bring the different totalizers into operative position the arms 50 of the actuators 49 pass into and out of coöperative relation with the cams 63, and in order to prevent rocking movement of the actuators when said arms 50 are out of coöperative relation with the cams 63 brackets 69, Figs. 2 and 3, with laterally extending guide flanges 70 are provided, which fill the spaces between the cams 63 and extend to the sides of the end cams. These brackets are secured to the guides for the carriage and extend rearwardly and downwardly therefrom, Fig. 3.

The actuators or sectors 49 are shown and described as being movable with the frame 48 carrying the elements 59 of the various department totalizers but it is to be understood that this invention is not to be limited to the form of actuators shown, the gist of the invention, as far as the registering mechanism is concerned, being in the grouping of the denominational elements of the various totalizers, by which arrangement of the elements the movement of the totalizers is reduced and a considerable number of totalizers may be employed in a limited amount of space.

Figure 10:
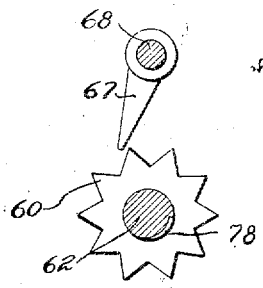
Figure 11:
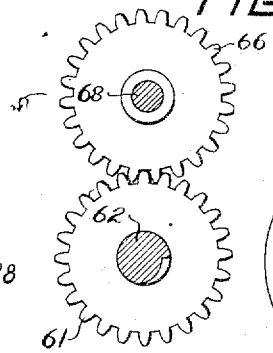
Figure 12:
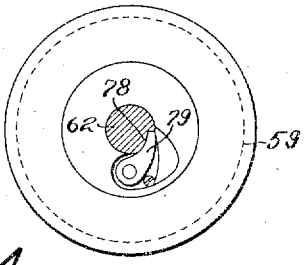
Figure 13:
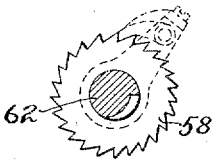
Figure 14:
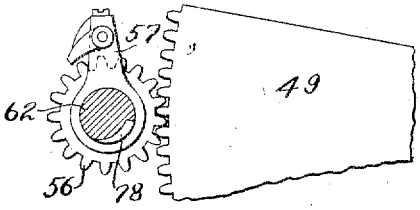

When on any drum 59 the sum of the value added and that previously registered exceeds ten, it is necessary that the drum of the next higher class of units be turned automatically. For this purpose each drum has fixed to it two wheels, namely a star wheel 60 and an ordinary toothed wheel 61, except in the case of the centime units drum to which only an ordinary toothed wheel is fixed. Each wheel 61 gears with a similar wheel 65, fixed to a sleeve 66, having on its other end a tooth 67 (Fig. 10). The sleeves are loose on spindles 68. When the centime units drum 59 has accomplished a revolution, the tooth 67 will displace the star wheel 60 fixed to the tens centime drum one tooth, and as the wheel 60 has ten teeth it will be displaced 1/10th of a revolution, that is the tens centime drum will be displaced by a unity. Similarly, each revolution of any other drum turns the fourth drum on its left through one graduation. Further, in order to secure the regular working of the above mentioned arrangement for the transfer of the units of the next higher class from one drum to the successive one, it is necessary that the displacement of a drum by the corresponding sector, does not begin until the drum of the units of immediately lower order, has been fully displaced and come to rest. For this purpose the cams 63 are keyed on the shaft 37 in the position shown by Figs. 24, 25, 26, 27, and owing to this arrangement the curved arms 50 are lowered at different and successive times. In order that the indications of the summing apparatus may reach thousands of francs, two other drums having on their edges the figures 0 up to 9 may be added on the same shaft 62. The first of these two additional drums (the hundreds drum) is fitted with a star wheel 60 and a toothed wheel 61 but the second drum is only fitted with a star wheel 60. These drums are turned in a similar manner to that above described.

*Total summing apparatus or grand totalizer* (see Figs. 3 and 15).—These elements of this totalizer are similar to the department totalizers and are mounted upon a shaft 76 which is supported by the framework of the machine instead of being supported by the carriage 48 like the shaft 62 carrying the elements 59 of the department totalizers. Sectors 71 mounted loosely upon a shaft 72 actuate the elements of the grand totalizer in a manner similar to the actuators 49 for the department totalizers. The sectors 71 are equally spaced with the determining devices 44 and are provided with projections 74, which projections are held by springs 73 into contact with heads 75 of the rods 53. These heads are so formed that in their position of rest they form a continuous track so that when the carriage 48 carrying the department totalizer is moved the track will slide under the projections 74 supporting them without causing any alteration of the total summing apparatus or grand totalizer. With this arrangement whenever a sum is added to one of the partial summing devices or department totalizer it is added also to the grand totalizer. The transfer devices between the elements of the grand totalizer are identical to the transfer devices between the elements of any of the department totalizers and are mounted upon a spindle 77 suitably supported by the frame work of the machine.

*Restoring the partial and total summing apparatus to nil* (see Figs. 9 to 15).—Along the shafts 62 and 76 there is a groove 78 and each drum 59 is fitted with a retaining pawl 79, so placed as to permit these disks to revolve in the proper direction around the shafts whereon they are loose. The ends of these shafts 62 and 76 are square shaped and may be turned by means of a handle from the side of the machine on which is the handle 19. If, with the summing apparatus at rest, these shafts be turned in the direction in which the disks 59 ordinarily revolve, the pawls 79 will successively be engaged by the groove 78 and be compelled to turn so the disks 59 will turn. Thus with one revolution of the shafts 62 and 76 all the pawls 79 will cause the disks 59 to take up such a position that all the figures of one value will be in a straight line.

*The lever for determining the department of sale* (see Figs. 1, 2 and 16).—*Displacement of the carriage.*—The lever 13 pivoted on the shaft 29 is fitted with a bevel toothed sector 80 gearing with another toothed sector 81 fast with a lever 82 pivoted on a fixed axle 83. The upper end of this lever is slotted to receive a pin 84 on a lever 85 pivoted at 86 and having its upper end also slotted to receive a pin 87 on the carriage 48 of the partial summing apparatus. The lower part of the lever 82 is bent and carries a pin 88 engaging a fork connected with a carriage 89 bearing the paper roll for the duplicate described below. The arrangement of the levers 82 and 85 is such, that on stopping the lever 13 at one of the notches corresponding to the departments A, B, C, D, the partial summing apparatus of this department will be in a position to be actuated by its sectors 49 under the control of the determining devices or pieces 44. A label 90, see Fig. 3, having the letters A, B, C, D and fixed on the side frame of the carriage 48, will show for each position of lever 13 the corresponding indication of the determined department, and this indication will appear through the opening 8. The lever 13 is provided with a spring plunger $13^a$, Figs. 1, 4 and 16, which is adapted to enter notches $13^b$ on the cylindrical part 3 adjacent to the slot through which said lever 13 plays and thereby prevent accidental displacement of said lever.

From the above it follows that the machine should not be operated when the lever 13 has not been stopped at one of the department notches. In order to prevent the operation of the machine except when the lever 13 is in proper position, this lever is provided with four teeth 91. Another lever 92 pivoted on a fixed pin 93 has on it a tooth 94 engaging the teeth 91, and a second tooth 95 engaging the teeth of ratchet wheel 96 keyed on the shaft 37. The four teeth 91 are cut in such a manner that whenever the lever 13 is in correct position one of them will raise the tooth 94 and disengage the tooth 95 from the teeth of the wheel 96, but if the lever 13 is stopped at any intermediate position the spring 97 urging the lever 92 against the wheel 96, will compel the tooth 95, to engage in the teeth of said ratchet wheel 96, and thereby prevent the shaft 37 from turning. In order to prevent movements of the lever 13 during the revolution of handle 19, the lever has on its lower part four notches 98, and a bell crank lever 99 pivoted at 100 has on one arm a tooth 101 adapted to engage the notches 98, while its other arm ends in a hook 102 which is normally held in a notch 104 formed in the surface of a disk 103 secured to shaft 37 by a spring 105. Upon the rotation of the shaft 37 the hook end 102 of the bell crank 99 will be cammed out of the notch 104 onto the surface of the disk 103, in which position the tooth 101 of the bell crank will engage with one of the notches 98 of the lever 13 and thereby prevent movement of said lever, in which position it is shown in Fig. 16, this figure showing the machine in a partly operated condition. A spring 105 keeps the hook 102 in contact with the edge of the wheel 103 so that when the shaft 37 and cam 103 are turning the wheel 102 will be against the edge of the wheel and the tooth 101 will engage one of the notches 98 and therefore the lever 13 cannot move, and it will be let free only when the hook 102 enters the slot 104 compelling the other arm of the bell crank lever to withdraw the tooth 101 from the notch 98.

*The indicators* (see Figs. 2, 3, 17).—The indicators consist of eight hollow drums mounted loose on a fixed shaft 106. Four of these drums 107, 108, 109, 110 are designed to show to the public the amount received, and the other four 111, 112, 113, 114 to show the same amount to the cashier. Each drum has on its edge a rim fitted with teeth 115. To the drums 107, 108, 111, 112 are fixed pinions 116 and in each drum is a spiral spring $116^a$ having one end fixed to its periphery and the other end to the shaft 106, as shown in dotted lines in Fig. 3. Four racks 117 pivoted at 118 on the pieces 44 engage the pinions 116, being kept up to their work by blade springs 119. Each rack 117 is in contact with a horizontal rod 120 sliding in fixed guides 121 and fitted with springs 122 while their other ends come in contact with projections 123 on the cams 63. When the shaft 37 begins to turn and before the pieces 44 move, the rods 120 will be pushed back by the projections 123, whereby the racks 117 will disengage pinions 116, and the drums 107, 108, 112, 111 by reason of their springs will come back to their zero position against a fixed stop, and in this position they will show 0 through the openings 5. The projections 123 remain in contact with the rods 120 after the contact between the pieces 44 and the cams 43 ceases. The pieces 44 when released by the cams, turn under the action of the springs 45 and the racks 117 will move down. When the racks 117 have completed their displacement and come to rest in their lowest position, the contact of the projections 123 with the rods 120 ends, and the springs 119 will put the racks into gear with the pinions 116 and, as the pieces 44 return to their normal position, the racks will rise and rotate the drums to show the amount registered, which will remain visible until the next operation. In order to move the other drums 109, 110, 113, 114 there are four pairs of pinions gearing the drum 107 with 110, 108 with 109, 112 with 113, and 111 with 114. These pairs of pinions are mounted on turning sleeves loose around two countershafts 124 and 125.

*Concealing the indicators* (Figs. 17 and 18).—A lug 126 on one of the determining pieces 44 is in contact with the horizontally bent end 127 of a vertical rod 128 fitted with a spring 129 and sliding in fixed guides. The upper end of the rod 128 is forked and connected with a lever 130 against which a spring 131 presses an arm 132 fast with an arm 133 pivoted on shaft 106 and carrying two shields 134 connected at their other ends by another arm 135 similar to 133. Normally the lug 126 is up and the openings 5 remain uncovered, but when the machine is being operated the lug 126 falls and the shields 134 will cover the indicators during their movement.

*Numerators* (see Figs. 4, 19 to 23).—The five numerators are placed in the cylindrical part 3. The upper one is the general numerator and the other four are respectively assigned to the departments A, B, C, D. Each element of a numerator consists of a disk 136 showing the figures 0 to 9, and connected with a ratchet wheel 137 having ten teeth and a notch 138. The general numerator may indicate the thousands and consists of four elements. The partial numerators indicate the hundreds and each consists of three elements. The elements of each numerator are loose on a shaft on which a lever 139 is mounted. This lever 139 is fitted with a set of pawls 140 of decreasing length, one for each ratchet wheel 137. When the lever 139 moves, the longest pawl gearing with the ratchet wheel annexed to the units disk will displace it one tooth. When this units disk has been displaced by ten teeth, its pawl will fall into the notch 138 and thereby all the pawls will be lowered and thus the second pawl will be put into action and will turn the tens wheel 137 one tooth. Owing to this displacement of the tens wheel the pawls 140 will be restored to their normal position. When the tens wheel is displaced by ten teeth, the two longest pawls will enter these notches and so the hundreds wheel will be turned and so on. The four levers 139 of the partial numerators are in different vertical planes, and the lever of the total numerator ends with a horizontal arm 141 having such a length as to cover the four. The shaft 37 on the right hand of the machine is square, and a cam 142 engaged by a fork 143 fixed to the carriage 48 is threaded on it. It is evident that when the carriage moves, the cam 142 will take various positions on the shaft 37, and when the shaft 37 revolves the tooth 144 of the cam will encounter only one of the levers 139 of the partial numerators, but it will always encounter the arm 141 of the general numerator. Spring detent 145 working in the teeth of the wheel 137, prevents backward movement, and each lever 139 is restored to its normal position by means of a spiral spring. To restore the numerators to zero, the same contrivance as for the summing apparatus is adopted, that is to say, each shaft has a groove and each disk 136 is fitted with a pawl. In order to enable the five numerators to be put to zero simultaneously, each shaft has a toothed wheel 146 on its end, gearing with other wheels 147 mounted between them. Owing to this gearing, it will be sufficient to move one numerator and the five will return to zero. For this purpose the end of the central numerator shaft is square shaped, and may be actuated from the side of the machine.

*The printing apparatus* (see Figs. 2, 15 and 28).—Each of the pieces 44 is fitted with a sleeve 148 surrounding the shaft 29, and on the end of each sleeve is an arm 149 carrying two sectors 150, 151 bearing the figures 0 up to 9 in relief. The lever 13 is mounted on a sleeve having an arm with a sector 152 provided with the letters A, B, C, D in such a way that when the lever 13 is moved and the ends 46 of the pieces 44 have reached the locked keys, the letter denoting the department and the amount determined by the keys will be arranged in a straight line M N on the upper sector, and the same amount will be ranged along the line P Q on the lower sector (Fig. 28). The paper from a roll 153 passes between cylinders 154, 155 which print on it the consecutive number and the date, and moves down an incline 156, and while a platen 157 presses it against the upper sector 150 to print the amount and the letter denoting the department, a knife 158 cuts off the ticket and lets it fall on the plate 20.

*Mechanism for printing the consecutive number and the date*, (see Figs. 28 to 38).—The upper cylinder 155 presses the paper against the printing cylinder 154, which has on it two ribs 159 the developed length of which is that of a ticket. As the ribs 159 touch the upper cylinder 155, they will draw off the length of a ticket and afterward as the cylinders continue to turn the ribbon will remain slack. The cylinder 154 has also a pin 160 in contact with cylinder 155 when the machine is at rest to hold the web. This cylinder 154 is hollow and has in it seven small disks 161, 162, 163 projecting through an opening in the curved surface. Four of these disks will print the number of the ticket up to 9999. A larger disk 162 prints the month and the other two 163 print the day from 1 to 31. The disks 163 are displaced by hand every morning by means of two buttons 164, and the disk 162 is displaced every month by means of another button 165. The two buttons 164 are on two sleeves and the button 165 is on a shaft whereon the sleeves are mounted. The shaft and sleeves carry toothed wheels 166 gearing with similar toothed wheels 167 fixed to the disks 162 and 163. The small disks 161 are moved automatically by means of the gearing hereinafter described (see Figs. 35 and 36). On the cover of a roller 154 is a slot 168 acting as a guide for a pin 169, the end of which runs in a ring 170 (Fig. 35) connected by another pin 171 with the casing of the machine; the ring 170 may describe a certain arc around the pin 171. The other end of the pin 169 is fixed to an arm 172 connected with a lever 173 movable on the shaft 174 of the disks 161, and having on it a set of four pawls 175, similar to those already mentioned for actuating the numerators and engaging the teeth of four ratchet wheels 176, each of which is fast with one of the printing disks 161. Each ratchet wheel has ten teeth and a larger notch 177 wherein one of the pawls 175 may enter. On the other side there are four retaining pawls 178. Since the groove of the ring 170 is eccentric to the shaft of the cylinder 154, as this latter revolves the pin 169 will be displaced in its slot 168 and operate the arm 172 and lever 173, thus the wheels 176 will be turned. The disks 161 may be restored to zero similarly to the summing apparatus and the numerators. The roller 154 is inked by a small cylinder in contact with it.

To put the printing mechanism out of action, in order to operate the machine, without making tickets, the cylinder 155 is loose on its shaft 179, which is eccentrically supported by bearings in the casing of the machine. On one of the eccentric ends of the shaft 179 there is a button 180, by which the cylinder 155 owing to the eccentricity of its bearings may be moved away from the cylinder 154. Furthermore the automatic movement of the four disks 161 must be stopped, because the movement of the cylinder 155, while making it impossible for the machine to print, will not prevent the movement of the disks 161, for should the handle 19 be turned the cylinder 154 on revolving would turn the printing disks 161. To avoid this, the movement of the cylinder 155 away from 154 displaces the ring 170 and so makes the circular groove concentric with the axle of the cylinder 154. Therefore although the pin 169 slides during the revolution of the cylinder 154 in the circular groove of the ring 170, it does not travel in the slot 168, and thus remaining at an invariable distance from the axle of the cylinder 154 it will not operate the levers 172 and 173. To give the necessary movement to the ring 170, there is a lever 181 pivoted at 182, whose lower end is forked to engage a pin 183 on the periphery of the ring 170. When the button 180 is moved, an arm 184 on the axle 179 turns the lever 181 around its pivot 182, which causes the ring 170 to revolve around the pin 171. To give movement to the roller 154, there is a wheel 185, keyed on its axle and gearing with a similar toothed wheel 186 keyed on the shaft 37 (see Fig. 4). The paper after having left the cylinders 154 and 155 reaches the printing sectors 150 when the mechanism comes into action to cut the ticket to a given size and press the paper against the sectors 150. This mechanism consists of a disk 187 keyed on the shaft 37, on the back of which is cut a groove 188 wherein a pin 189 fixed to a block 190 may run. This block slides in two fixed guides and carries an india rubber platen 157 for forcing the paper against the sectors 150. A knife 158 is fixed to the block 190, and as the disk 187 revolves, owing to the shape of the groove 188 the pin 189 moves the block twice up and down while the disk 187 makes a revolution. The first descent of the block is short and during this the inking of the sectors 150 takes place. On the second descent the india rubber block will press the paper and print upon it the price and the letter denoting the department, while the knife 158 will cut the ticket and let it fall onto the plate 20. To ink the two sectors 150, 151 along the lines M N and P Q, there is a bell crank 191 loose on the axle 29 and carrying at its ends two inkers 192, 193 fitted with springs 194. The arm carrying the inker 192 is pulled down by a spring 195, and when the roller 154 revolves, a tooth 197 fixed on it will meet the arm 196 of the bell crank, which will turn the inkers 192, 193 on to the lines M N and P Q, and the piece 157 will be slightly pressed against the sectors 150 on the first descent of the block 190. This will also take place, as will be seen, for the pressing piece 193 which will be also forced against the sectors 151. As the roller 154 continues its rotation, the tooth 197 will free the arm 196, and the bell crank under the influence of spring 195 will return to its former position of rest.

*Carriage for the duplicates.*—The carriage 89 carries a spindle 198, supporting the roll of paper 199, which passes over an india rubber roller 200, and is wound on a sleeve 201, loose on a shaft 202. The roll 200 and the shaft 202 are supported by an arm 203 pivoted on spindle 198. The sleeve 201 has on it a ratchet wheel 204 gearing with a pawl 205 fixed to the carriage 89. The arm 203 has a lug 206, against which at every position of the carriage 89 an arm 207 on a vertical rod 208 will strike. This rod is constantly pushed down by a spring 209 and may slide in two guides fixed to the casing of the machine. The roller 154 has upon it two teeth 211, 212; 212 being longer than 211. When the roller 154 rotates, the tooth 211 will meet a pin 210 on the rod 208, which is thus raised; thereby the india rubber roller 200 will force the inker 193 against the sectors 151. Soon afterward the tooth 212 will raise the rod 208 a little more than before, and so the roller 200 will press the paper against the printing sectors 151, which will therefore print as stated the amount received. At every descent of the arm 203, the pawl 205 will cause the ratchet wheel 204 to turn and draw off the paper. The paper on the roller 199 is wider than the travel of the carriage 89, and the duplicate amounts are printed upon it in different columns, one column for each department.

*Opening the drawer 4.*—The drawer 4 has on it rollers 213 running in guides 214 and a spring 215 tends to push it outward. Over the drawer, inside the machine, there is a Y shaped lever 216 pivoted at 217 and kept in position by a spring 218. When the drawer is shut, an arm 219 of the lever 216 is in contact with a tooth 220 on the back of the drawer and prevents it being opened. On the shaft 37 there are keyed a ratchet wheel 221 and a pinion 222. When the shaft turns, a finger 223 on the pinion strikes a pin 224 on the lever 216 and presses it down; the arm 219 rises and frees the tooth 220, which permits the opening of the drawer. The finger 223 then meets the arm 225 of a hammer which rings a bell 226. As the drawer opens, the tooth 220 meets a stop 227. In the meanwhile the arm 219 will have been pulled down lower than when it was supported by the tooth 220, and a hook 228 on the lever 216 will engage with the ratchet wheel 221 and prevent the machine acting until the drawer is shut again raising the arm 219 and freeing the wheel 221. To open the drawer without actuating the machine it will be sufficient to press upon a handle 229 on the lever 216.

*Working the machine.*

In order then that all the mechanism may be actuated the axle 37 only requires to be turned. The pinion 222 keyed on this axle gears with a wheel 230, and this in its turn gears with a pinion 231 connected with the handle 19. It suffices therefore in order to work the machine to turn this handle twice around, which will cause one complete revolution of the shaft 37. The movement of the handle in the wrong direction, is prevented by means of a pawl fixed to the casing of the machine and gearing with a ratchet wheel 232 fast with the pinion 231.

What is claimed is:

1. In cash registers having a cylindrical key board and sets of keys, the combination with each set of keys of a sector having a rim concentric with the cylindrical key board and fitted with holes in each of which the end of a depressed key may enter, a stepped piece rotatable about the axis of the cylindrical key board, a spring exerting tension on said stepped piece to cause the same to turn, and a lever arm rotating together with said stepped piece until its end strikes against the end of the depressed key projecting inside of the perforated rim, substantially as and for the purposes described.

2. In cash registers, the combination with the keys, and the summing mechanisms, of a stepped piece, rotatable about an axis through an angle determined by the depression of a key, and a spring actuated rod, which is permitted to move on the rotation of the stepped piece until it meets one of the steps to control the operation of the summing mechanisms, substantially as described.

3. In cash registers, the combination with the main shaft, and with each set of keys, of a partial summing mechanism, a spring actuated stepped piece free to turn about an axis, a cam keyed on the main shaft of the machine and controlling said stepped piece, a spring actuated rod, vertical guides in which the rod slides, the rod being permitted to move on the rotation of the stepped piece, until it meets one of the steps and a toothed sector permanently connected with the sliding rod and controlling the operation of the partial summing mechanism, substantially as described.

4. In cash registers, a set of partial summing apparatus, a sliding carriage on which the partial summing apparatus is mounted, the carriage being arranged to be traversed so as to bring any desired apparatus into position to be acted on, a toothed sector and a spring actuated sliding rod, with which each partial summing apparatus is permanently connected and a rotatable stepped piece, which in connection with the said sector and sliding rod controls the operation of the said summing apparatus, substantially as described.

5. In cash registers, the combination with a set of keys, of a part rotatable about an axis through an angle determined by the depression of a key, and of several partial summing apparatus, a toothed sector and a spring actuated sliding rod, with which each partial summing apparatus is permanently connected, and a carriage on which the several summing apparatus are mounted, and which can be traversed, so as to bring any desired apparatus to be acted on by the rotatable part, substantially as described.

6. In cash registers, a carriage, a shaft carried by the carriage, several partial summing apparatus having their like elements mounted together on said shaft to reduce the travel of the carriage, mechanism for controlling the operation of the summing apparatus, and means whereby the carriage can be moved to bring any desired apparatus into position to be acted on by said mechanism, substantially as described.

7. In cash registers the combination with several partial summing apparatus, toothed sectors provided with curved arms, the cams controlling the movement of the summing apparatus, a carriage on which the several partial summing apparatus are mounted, and which can be traversed, so as to bring any desired apparatus into position to be acted on by said cams, and the guides for the carriage, of brackets with shields, fastened on the guides of the carriage, whereon rest the arms of the toothed sectors which are not in correspondence with a cam, substantially as and for the purposes described.

8. In cash registers, the combination of a sliding carriage, several partial summing apparatus carried by said carriage, a fixed axle, stepped pieces mounted on said fixed axle, sliding rods controlling the movement of the partial summing apparatus, a total summing apparatus fixed to the frame of the machine, and means whereby the sliding carriage can be shifted to bring the sliding rods controlling the movement of the partial summing apparatus to be acted on into operative position between the stepped pieces and the total summing apparatus, substantially as and for the purpose described.

9. In cash registers the combination with the sets of keys of a rotatable stepped piece in correspondence with each set of keys, several partial summing apparatus, a sliding carriage on which the several partial summing apparatus are mounted, sliding rods adapted to engage the stepped pieces and controlling the movement of the several partial summing apparatus, means for maintaining in their position of rest the sliding rods which are not in correspondence with the stepped pieces, a total summing apparatus and heads formed on the upper end of said rods, to establish a temporary connection between the total summing apparatus and the partial summing apparatus brought in the operative position, substantially as described.

10. The combination with a set of numerators provided with disks, and independent shafts on which the numerators are respectively mounted, of a device for putting simultaneously to zero the said disks, the said device consisting in the combination of toothed wheels, keyed on the shafts, on which the numerators are mounted, with like toothed wheels gearing with them in such a manner that, by turning one of the shafts, the other shafts are also caused to turn in the same direction through the same angle, substantially as described.

11. In cash registers the combination with the several partial summing apparatus the lever for determining the department of sale, the casing provided with notches corresponding to the departments of sale, and at which the lever may be stopped, and the main shaft of the machine, of a ratchet wheel keyed on the main shaft a fixed pin, a spring actuated lever pivoted on said fixed pin and having a tooth adapted to engage the ratchet wheel and stop the movement of the main shaft, and means for disengaging said tooth from the ratchet wheel when the lever for determining the department of sale is stopped at one of the department notches, substantially as and for the purposes described.

12. In cash registers the combination with several partial summing apparatus, of a lever for determining the department of sale, the said lever being provided with notches, a wheel, keyed on the main shaft and provided with a slot, and a spring actuated bell crank lever with toothed ends, the tooth at the end of one arm engaging the slot, when the machine is at rest, and the tooth at the end of the other arm engaging the notches and thus preventing any movement of the lever for determining the department of sale during the rotation of the main shaft, substantially as described.

13. In cash registers, the combination of the drums indicating the amount of each purchase and provided with teeth, racks gearing with the teeth on the drums, as they return to their normal position and means for withdrawing the racks from gear for the first part of their travel, substantially as described.

14. In cash registers, the combination with the summing apparatus, of rotatable stepped pieces controlling the movement of the summing apparatus, racks connected with said stepped pieces, drums indicating the amount of each purchase and provided with teeth, a shaft on which the drums are loosely mounted, spiral springs arranged in the drums and having one end fixed to the shaft and the other to the periphery of the drums, the racks gearing with the teeth on the drums as they return to their normal position, and means for withdrawing the racks from gear for the first part of their travel, the spiral springs restoring the drums to zero when the racks are out of gear with said teeth, substantially as described.

15. In cash registers, the combination with the summing apparatus, of rotatable stepped pieces controlling the operations of the summing apparatus, indicating drums, racks connected with said stepped pieces and controlling the movement of the indicating drums, the said racks being moved up and down by the movement of the stepped pieces, toothed wheels secured to the indicating drums, springs maintaining the racks in gear with said toothed wheels, cams controlling the movement of the stepped pieces and provided with projections, sliding rods provided with springs and adapted to be pushed against the racks by means of the projections on the cams to cause the racks to disengage the toothed wheels of the indicator drums while the racks move down, the projections on the cams disengaging the sliding rods when the racks are in their lowest position, thereby permitting the racks to again gear with the toothed wheels of the indicating drums, substantially as described.

16. In cash registers, the combination with the main shaft of the machine provided with a handle, and a drawer having a tooth on the back thereof, of a Y-shaped lever one arm of which rests on said tooth, a spring for holding the lever in position, thus preventing the drawer being opened when the machine is at rest, means for raising said arm and freeing the drawer when the handle of the machine is turned, a ratchet wheel on the main shaft of the machine and a hook on another arm of the Y-shaped lever, which engages the said ratchet wheel when the drawer is open, and prevents the machine acting until the drawer is shut again, substantially as described.

17. In cash registers, the combination with the sets of keys, of a sliding carriage on which are mounted several partial summing apparatus, a sliding carriage on which is mounted a paper roll for printing the duplicates of the tickets issued in separate columns, partial numerators corresponding to the different sale departments, a sliding cam acting on said partial numerators, a hand lever by means of which the above said carriages and cam are shifted in the proper position, before operating the machine, corresponding to the sale department to which the amount received belongs, a total summing apparatus adapted to act whichever of the partial summing apparatus is operated, a general numerator actuated by the same cam which actuates the partial numerators, rotatable stepped pieces in correspondence with each set of keys, toothed sectors, sliding rods and racks by means of which the said stepped pieces control the movement of the summing apparatus and of the indicators, means for preventing the operation of the machine when the hand lever determining the department of sale is not in the proper position, as when the drawer is open, means for preventing the depression of the keys during the operation of the machine and for restoring the keys in their normal positions, and means for printing and issuing tickets cut in the proper lengths, substantially as described.

18. In a machine of the class described, the combination with a plurality of totalizers each having a plurality of denominational elements, of a movable frame having a shaft mounted therein for supporting the elements in horizontal alinement and with the same denominational elements of the various totalizers grouped together, and means for moving the frame so as to bring the various totalizers into position to be actuated.

19. In a machine of the class described, the combination with a plurality of totalizers each having a plurality of denominational elements, of a movable frame having a shaft mounted therein for supporting the elements in horizontal alinement and with the same denominational elements of the various totalizers grouped together, actuators for said totalizers mounted upon the frame and movable therewith, and means for moving the frame so as to bring the various totalizers into position to be actuated.

20. In a machine of the class described, the combination with a plurality of totalizers each having a plurality of denominational elements, of a movable frame having a shaft mounted therein for supporting the elements in horizontal alinement and with the same denominational elements of the various totalizers grouped together, actuators for said totalizers mounted upon the frame and movable therewith, means for moving the frame so as to bring the various totalizers into position to be actuated and differentially movable devices for determining the extent of movement of the actuators for the selected totalizer.

21. In a machine of the class described, the combination with a plurality of department totalizers each having a plurality of denominational elements, of a movable frame having a shaft mounted therein for supporting the elements in horizontal alinement and with the same denominational elements of the various totalizers grouped together, actuators for said totalizers mounted upon the frame and movable therewith, a grand totalizer for accumulating the total of all of the department totalizers, actuators for the grand totalizer, and a single set of differentially movable devices for determining the extent of movement of the actuators for the selected department totalizer and also of the actuators for the grand totalizer.

22. In a machine of the class described, the combination with a plurality of totalizers each having a plurality of denominational elements, of a movable frame having means for supporting the elements in alinement and with the same denominational elements of the various totalizers grouped together, a single set of differentially movable elements for the plurality of sets of totalizer elements, and means for moving the frame so as to bring the various totalizers into position to have their elements actuated from the differentially movable elements.

23. In a machine of the class described, the combination with a plurality of totalizers each having a plurality of denominational elements, of a movable frame having a shaft mounted therein for supporting the elements in horizontal alinement and with the same denominational elements of the various totalizers grouped together, a single set of differentially movable elements for the various totalizers, and means for moving the frame so as to bring the various totalizers into position to be actuated under the control of the differentially movable elements.

In testimony whereof I affix my signature in the presence of two witnesses.

ROBERTO TAEGGI PISCICELLI.

Witnesses:
H. C. Coxe,
G. H. Wart.